United States Patent
Ebenwalder et al.

(10) Patent No.: US 9,304,337 B2
(45) Date of Patent: Apr. 5, 2016

(54) FARADAY ROTATOR FOR AN OPTICAL ISOLATOR

(71) Applicant: Coherent LaserSystems GmbH & Co. KG, Göttingen (DE)

(72) Inventors: Peter Ebenwalder, Göttingen (DE); Sebastian Koke, Göttingen (DE); Stefan Spiekermann, Göttingen (DE)

(73) Assignee: COHERENT LASERSYSTEMS GMBH, Göttingen (DE)

( * ) Notice: Subject to any disclaimer, the term of this patent is extended or adjusted under 35 U.S.C. 154(b) by 9 days.

(21) Appl. No.: 14/154,150

(22) Filed: Jan. 13, 2014

(65) Prior Publication Data

US 2015/0198823 A1    Jul. 16, 2015

(51) Int. Cl.
*G02F 1/09* (2006.01)
*G02F 1/00* (2006.01)

(52) U.S. Cl.
CPC .............. *G02F 1/093* (2013.01); *G02F 1/0036* (2013.01)

(58) Field of Classification Search
CPC ................................ G02F 1/093; G02F 1/0036
USPC .......... 359/483, 484, 324, 280, 484.01–484.1
See application file for complete search history.

(56) References Cited

U.S. PATENT DOCUMENTS

| 4,909,612 | A | | 3/1990 | Scerbak et al. |
| 5,528,415 | A | | 6/1996 | Gauthier et al. |
| 5,715,080 | A | * | 2/1998 | Scerbak ..................... 359/281 |
| 7,206,116 | B2 | | 4/2007 | Fehn et al. |
| 2003/0058907 | A1 | * | 3/2003 | Nasu et al. .................... 372/34 |
| 2004/0240031 | A1 | * | 12/2004 | Azimi et al. .................. 359/280 |
| 2005/0225831 | A1 | * | 10/2005 | Fehn et al. .................... 359/280 |
| 2009/0237771 | A1 | * | 9/2009 | Nakamura et al. ........... 359/280 |
| 2009/0290213 | A1 | * | 11/2009 | Yamazaki .................... 359/484 |

FOREIGN PATENT DOCUMENTS

EP     0 279 412     *   8/1988  ............... G02F 1/09

* cited by examiner

*Primary Examiner* — Jordan Schwartz
*Assistant Examiner* — George G King
(74) *Attorney, Agent, or Firm* — Morrison & Foerster LLP

(57) ABSTRACT

A Faraday rotator includes two magnet sub-assemblies assemblies spaced apart and aligned with each other with a gap therebetween. Each magnet sub-assembly includes a central magnet magnetized in direction parallel to the gap. The central magnet is sandwiched between two end magnets magnetized in a direction perpendicular to the gap. A magneto-optic crystal is located in the gap between the central magnets.

14 Claims, 4 Drawing Sheets ed, together with the general description given above
and the detailed description of the preferred embodiment
given below, serve to explain principles of the present invention.

FARADAY ROTATOR FOR AN OPTICAL ISOLATOR

TECHNICAL FIELD OF THE INVENTION

The present invention relates in general to optical isolators (optical diodes) providing non-reciprocal transmission of optical radiation. The invention relates in particular to Faraday rotators for use in such elements.

DISCUSSION OF BACKGROUND ART

Optical isolators have various uses in optical devices. By way of example they are used to provide unidirectional circulation of radiation in a ring laser-resonator (traveling-wave resonator) and to prevent feedback between stages of an optical amplifier. An optical-diode includes a crystal of a magneto-optic material. The magneto-optic material is used as a unidirectional polarization rotator, in conjunction with polarization-selective elements to provide the non-reciprocal transmission. The polarization rotation of the magneto-optical material is achieved by applying a magnetic field to the magneto-optic material, longitudinal in the direction of light propagation in the magneto-optic material.

It is common to have a non-reciprocal polarization rotation of 45° in one forward pass and accordingly 90° for back-reflected light. The polarization-selective elements are oriented in 45° with respect to each other, resulting in optical isolation of the back-reflected light. A deviation of the rotation angle has direct impact on the optical isolation performance Optical-isolators are most effective in a wavelength range between about 400 nanometers (nm) and 1100 nm. The effectiveness of an optical-isolator depends on a so-called "Verdet" constant of the magneto-optic material. This constant defines a degree of polarization-rotation, per unit length of the material, per unit applied magnetic field. The most widely used magneto-optic material for optical isolators is terbium gallium garnet (TGG) which has a relatively high Verdet constant compared with that of other magneto-optic materials. Polarization rotation provided by TGG is particularly temperature sensitive. Because of this, an optical isolator including TGG usually requires some form of temperature control to optimize optical isolation even under high power irradiation and under environmental changes.

A TGG crystal for use in an optical isolator is relatively expensive and contributes significantly to the cost of an optical isolator. Further, TGG, while nominally transparent to radiation in the above-referenced wavelength range, has a finite absorption for that radiation. The absorption can result in significant heating of the crystal in a case where high-power radiation is being transmitted by the crystal.

The higher the magnetic field that can be applied to a TGG crystal the smaller (shorter) the crystal needs to be to provide a required polarization rotation. The smaller the crystal, the less expensive the crystal will be, and the less the absorption of radiation will be.

One particularly effective arrangement for providing a high magnetic field in a crystal of a magneto-optic material is described in U.S. Pat. No. 7,206,166. Here, the magnetic field is provided by an effectively cylindrical arrangement of permanent magnets. The effectively cylindrical arrangement includes a central magnet which is an actual cylinder which is axially magnetized. The magnetic field of the cylinder extends within the cylinder, approximately parallel to the axis of symmetry of the cylinder, in only one direction from the north-pole to the south-pole. A roller-shaped magneto-optic crystal is arranged within the cylinder.

Terminal magnets are attached to each of the two end faces of the central magnet in a plane perpendicular to the axis of symmetry. Each of the terminal magnets is configured as a hollow cylinder and has a through-aperture in the extension of the axis of symmetry. Each terminal magnet is largely radially magnetized with regard to the axis of symmetry. One of the two terminal magnets is magnetized radially from interior to exterior and the other terminal magnet is magnetized radially from exterior to interior. Each of the terminal magnets is formed from a plurality of wedge-shaped magnets for effecting the radial magnetization of the terminal magnets.

While the arrangement of the '116 patent may be highly effective in providing a concentrated magnetic field, the arrangement has significant shortcomings. The cylindrical center magnet and the wedge-shaped magnets forming the terminal magnets will be expensive to produce compared with simple bar-magnets. The cylindrical assembly of magnets restricts direct thermal access to the magneto-optic crystal. Accordingly, thermal control of the magneto-optic crystal must be provided by placing the entire magnet assembly, with the magneto-optic crystal therein, inside a thermally controlled enclosure.

Such an enclosure would be relatively expensive and would require a relatively large power supply. Cost aside, however, control by such a large enclosure would have a very slow response time due to the large thermal mass of the magnet assembly, which could be over one-hundred times greater than the thermal mass of the magneto-optic crystal. There is a need for a magnet assembly capable of providing a magnetic field comparable to that of the '116 patent but which provides direct thermal access to the magneto-optic crystal, allowing the crystal temperature to be controlled independent of the magnets and with relatively fast response. Preferably the magnet assembly should be formed from simple bar-magnets for economy of construction.

SUMMARY OF THE INVENTION

In one aspect, a Faraday rotator in accordance with the present invention comprises first and second planar magnet-subassemblies spaced apart and parallel to each other forming a gap therebetween with a propagation-axis of the isolator extending through the gap. Each of the magnet subassemblies includes a first bar-magnet magnetized in a direction parallel to the propagation axis, the first bar-magnet being sandwiched between second and third bar-magnets magnetized in a direction perpendicular to the propagation axis. The first bar-magnets of each subassembly assembly create a dipole magnetic field in the gap, and the second and third bar magnets of each subassembly creating a quadrupole magnetic field reinforcing the dipole magnetic field in in the gap. The reinforced magnetic field provides magnetic lines of force in the gap parallel to propagation axis between the first magnets of the subassemblies. A magneto-optic crystal is located in the gap in the parallel magnetic lines of force.

In a preferred embodiment of the invention, a temperature control element is in thermal communication with the magneto-optic crystal. Thermal communication is provided by a thermal conductor extending into the gap.

BRIEF DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below, serve to explain principles of the present invention.

DETAILED DESCRIPTION OF THE INVENTION

Figure 1:
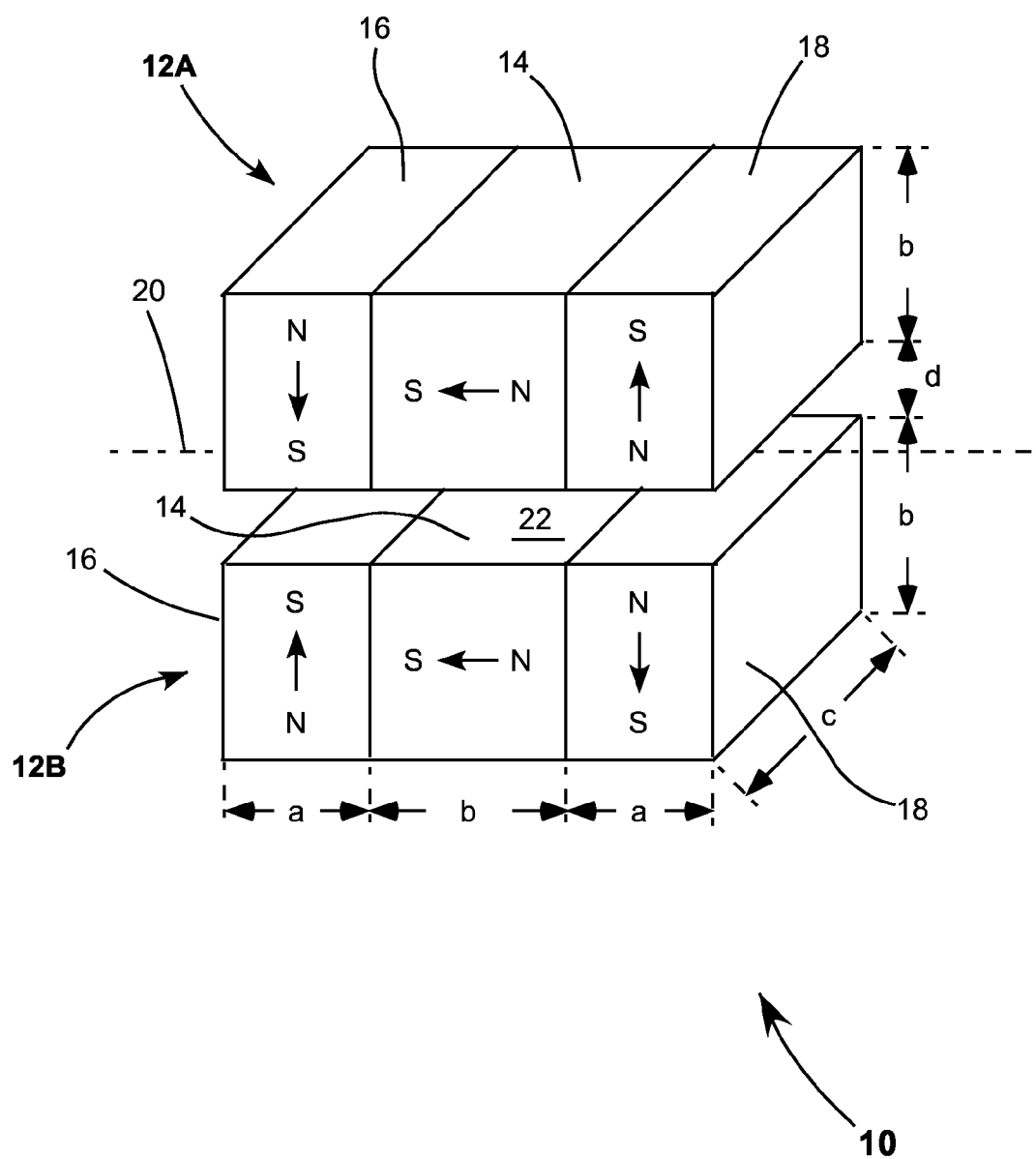
FIG. 1 is a three-dimensional view schematically illustrating a Faraday rotator in accordance with the present invention including first and second magnet sub-assemblies spaced apart about an axis of light-propagation in a gap between the sub-assemblies, each magnet sub-assembly including a central magnet magnetized in a direction parallel to the light-propagation axis, each central magnet sandwiched between first and second end magnets with the direction of magnetization of the first and second end magnets perpendicular to the light-propagation axis.

Referring now to the drawings, wherein like components are designated by like reference numerals, FIG. 1 schematically illustrates a preferred embodiment 10 of a Faraday rotator in accordance with the present invention for use in an optical isolator. Faraday rotator 10 comprises first and second planar magnet sub-assemblies 12A and 12B, vertically aligned with each other but vertically spaced apart from each other and parallel to each other. A light-propagation axis 20 (generally corresponding to a horizontal axis of symmetry of the Faraday rotator) extends through a gap 22 between sub-assemblies 12A and 12B. Here, it should be noted that the terms "vertical" and "horizontal" are used relatively herein, merely for convenience of description, and do not imply any particular spatial orientation of the inventive Faraday rotator in actual use.

Each magnet sub-assembly comprises a central bar-magnet 14 magnetized in a direction parallel to light-propagation axis 20. The magnetization direction of magnets 14 and other magnets described and depicted herein is indicated by an arrow between letters N and S indicating respectively North and South poles of the magnets. The direction of magnetization of magnets 14 is the same in each of the sub-assemblies. Because of this, magnets 14 can be considered together as forming a magnetic dipole unit.

In each magnet sub-assembly, central magnet 14 is sandwiched between end magnets 16 and 18. Each of the end magnets is magnetized in a direction perpendicular to axis 20, perpendicular to (the plane of) gap 22. In magnets 16, the direction of magnetization is toward gap 22. In magnets 18 the direction of magnetization is away from gap 22. Magnets 16 and 18 can be considered, together, as forming a magnetic quadrupole unit. The dipole unit magnetic field of magnets 14 is reinforced by the quadrupole field of magnets 16 and 18. This can result in a magnetic field force in excess of 1 Tesla (T).

Regarding dimensions of magnets 14, 16, and 18, magnets 16 and 18 each have a length "a" and magnets 14 have a length "b". The length of the magnets is defined in the propagation-axis direction. All magnets have a width "c". All magnets have a height "b" equal to the length of magnets 14 The gap width is "d". In relative terms, "b" is preferably greater than "a", and "c" is preferably greater than "b" and "a". It was found that if the height dimensions of the magnets was not the same a weaker magnetic field would be obtained.

Figure 2:
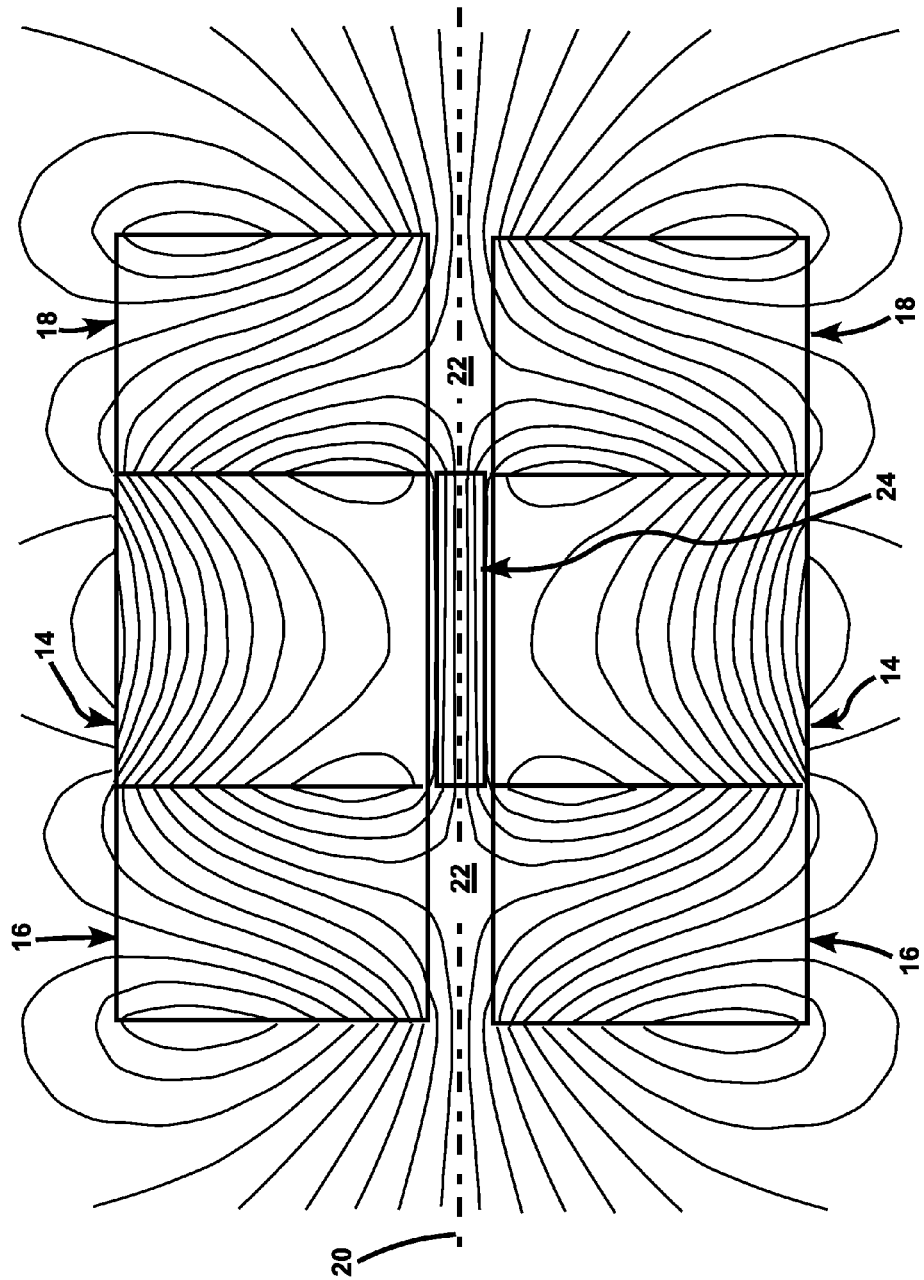
FIG. 2 is a side-elevation view of the Faraday rotator of FIG. 1 schematically illustrating computed lines of magnetic force created by the magnet sub-assemblies forming a concentrated magnetic field extending through the gap between the magnet sub-assemblies and through a magneto-optic crystal located in the gap.

FIG. 2 schematically depicts computed lines of magnetic force in an example of the Faraday rotator of FIG. 1. In FIG. 2 the components and axes of FIG. 1 are depicted together with a magneto-optic crystal 24 which is not visible in FIG. 1 because of the dimensions of the crystal relative to the dimensions of the magnets. Components, reference numerals, and lead-lines are depicted in bold to avoid confusion with lines of force, which are depicted by fine, solid lines.

For computing the lines of force it is assumed that dimensions "a" and "b" are 15 millimeters (mm) and 20 mm respectively. Gap 20 is assumed to have height of 3.54 mm and dimension "c" is assumed to be indefinitely extended. The magnets are assumed to be made of a neodymium, iron, and boron (NdFeB) alloy having a remnant magnetization of about 1.2 T. It can be seen that in gap 22 between central magnets 14, the lines of force are parallel to the gap (parallel to the light-propagation axis) and homogeneously distributed.

By making the width of the magnets 14 greater than the length of the magnets this homogeneous magnetic field extends laterally sufficiently to fill crystal 24. This provides a field comparable to that produced by the above-discussed cylindrical arrangement of the '116 patent at the expense of some loss of compactness, but with a much simpler and less expensive construction. The length of magnets 16 and 18 is selected to be only sufficient to achieve the parallel lines of force in essentially the entire gap between magnets 14 while minimizing the overall length of the sub-assemblies. It has been found that it is possible to reduce the requirement on precise length control of the TGG crystal and precise magnetic field strength of the magnets even further by slightly tuning the width of gap 22 between the magnets. In any event Gap 22 provides for direct-heating access to crystal 24, a description of one arrangement for such access is set forth below with reference to FIG. 3

Figure 3:
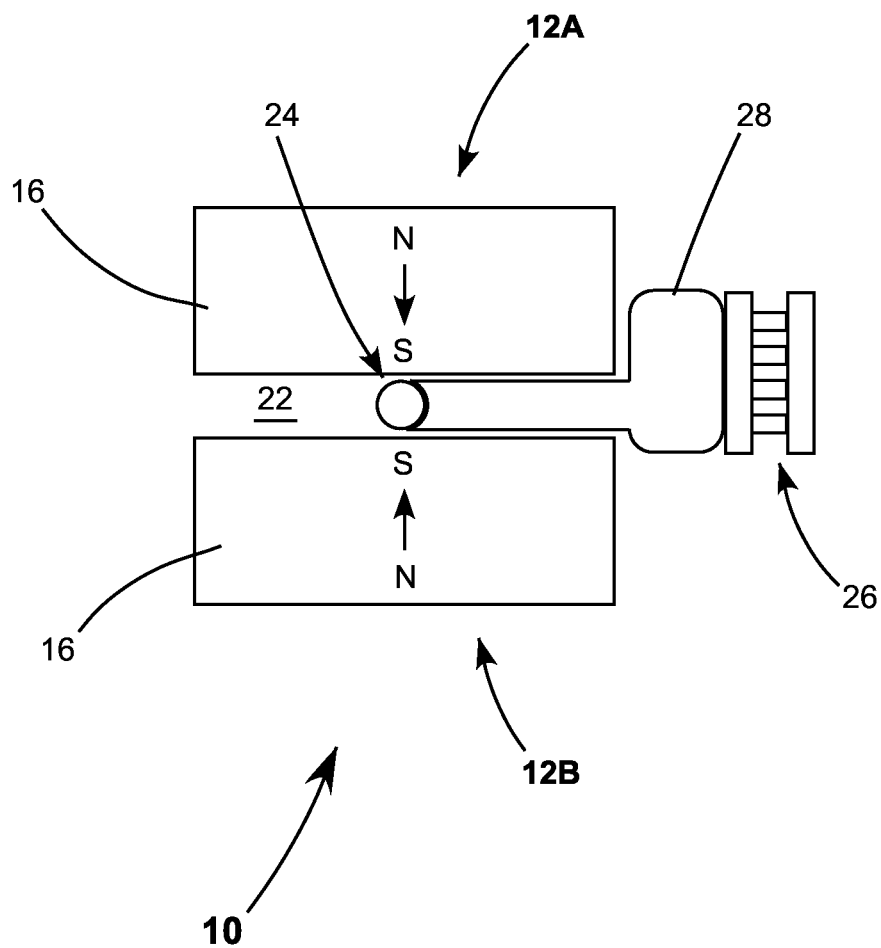
FIG. 3 is an end-elevation view of the Faraday rotator of FIG. 2 schematically illustrating a heating element located adjacent the Faraday rotator and in thermal communication with the magneto-optic crystal via a thermal conductor.

FIG. 3 is an end-elevation view of the Faraday rotator of FIG. 2 schematically illustrating a heating element 26 located adjacent the Faraday rotator and in thermal communication with the magneto-optic crystal via a thermal conductor 28. One suitable heating element is a power resistor. One suitable element capable of heating and cooling is a Peltier element. Thermal conductor 28 is preferably made from a material having good heat conductivity and a thermal expansion coefficient comparable to the thermal expansion coefficient of TGG (around $7 \times 10^{-6}$/K). Such a material can be a copper-tungsten (CuW) alloy or an aluminum based ceramic. This arrangement is much more convenient and significantly less expensive than heating the entire Faraday rotator, including the magnets. Thermal gradients can be kept to a practical minimum.

Figure 4:
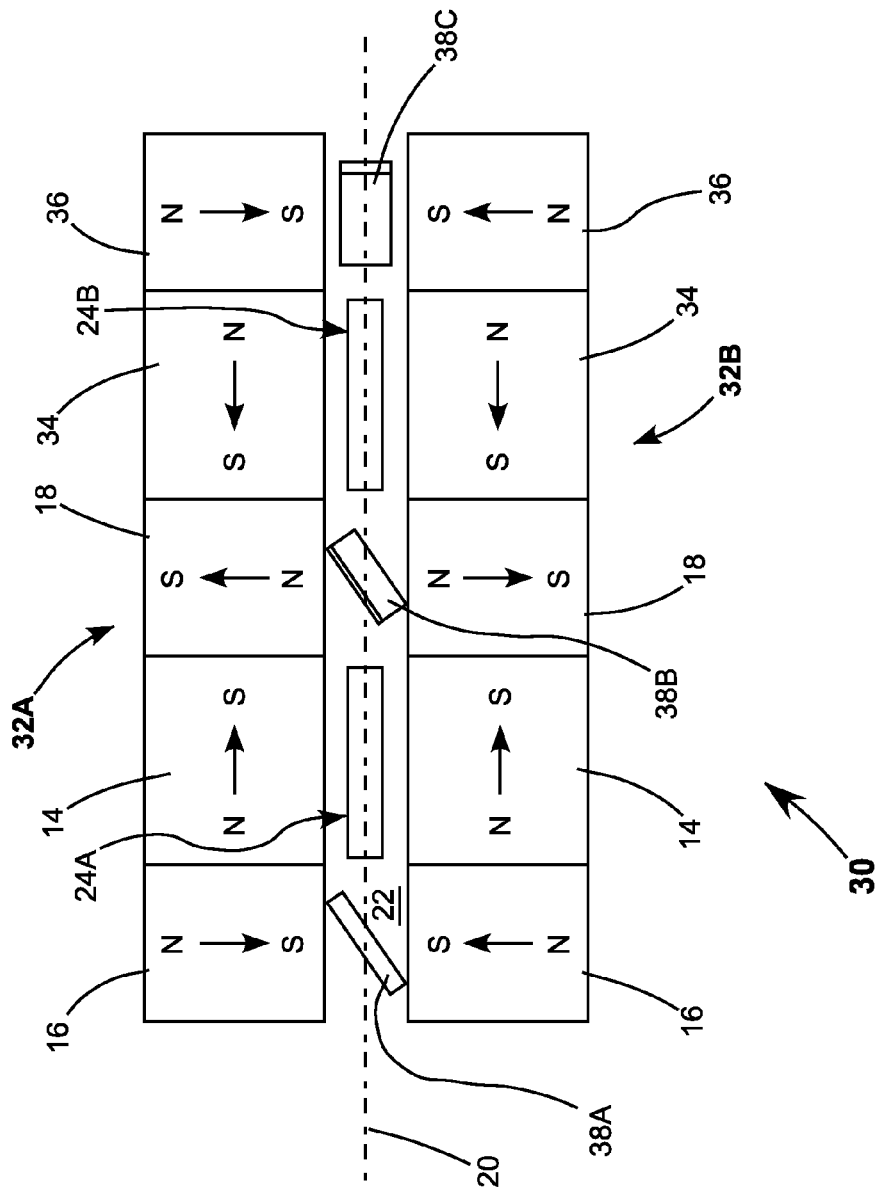
FIG. 4 is a side elevation view schematically illustrating another embodiment of a Faraday rotator in accordance with the present invention including first and second magnet sub-assemblies spaced apart about an axis of light-propagation in a gap between the sub-assemblies, each magnet sub-assembly including a central magnet magnetized in a direction perpendicular to the light-propagation axis, the central magnet sandwiched between first and intermediate magnets with the direction of magnetization of the first and second end magnets parallel to the to the light-propagation axis, and the central and intermediate magnets being sandwiched between first and second end magnets, the direction of magnetization of the end magnets being perpendicular to the light-propagation axis, and with first and second magneto-optic crystals located longitudinally spaced apart on the light-propagation axis in the gap between the sub-assemblies.

FIG. 4 is a side elevation view schematically illustrating another embodiment 30 of a Faraday rotator in accordance with the present invention. This embodiment is similar to the embodiment of FIGS. 1 and 2 but includes extended sub-assemblies 32A and 32B vertically aligned with each other but vertically spaced apart from each other and parallel to each other. Light-propagation axis 20 (generally corresponding to a horizontal axis of symmetry of the Faraday rotator) extends through a gap 22 between the sub-assemblies as in the embodiment of FIGS. 1 and 2. The sub-assemblies are extended as follows.

Two magnets 34, each thereof magnetized in a direction parallel to light-propagation axis 20, are added to form another magnetic dipole unit. Two magnets 36, each thereof magnetized in a direction perpendicular to gap are added to form another magnetic quadrupole unit.

Faraday rotator 30 includes two magneto-optic crystals 24A and 24B, with crystal 24A located between dipole magnets 14, and with crystal 24 located between dipole magnets 34. In FIG. 4, the inventive Faraday rotator is depicted as being configured as an optical isolator with crystal 24A between a polarizer 38A and a polarizer 38B; and with crystal 24B between polarizer 38B and a polarizer 38C. Each magneto-optic crystal rotates the polarization-plane of light transmitted therethrough by 45°. The polarization-plane of polarizer 38B is rotated 45° with respect to that of polarizer 38A; and the polarization-plane of polarizer 38C is rotated 45° with respect to that of polarizer 38B.

In terms used above for describing sub-assemblies 12A and 12B each sub-assembly 24 includes a central magnet 18 magnetized in a direction perpendicular to the light-propagation axis 20, i.e., perpendicular to gap 22. Central magnet 18 is sandwiched between first and intermediate magnets 14 and 34 with the direction of magnetization of the first and second end magnets parallel to the light-propagation axis, i.e., parallel to the gap. The central and intermediate magnets are sandwiched between first and second end magnets. The direction of magnetization of the end magnets is perpendicular to the light-propagation axis, i.e., perpendicular to gap 22. In magnets 16 and magnets 36, the direction of magnetization is toward the gap. In magnets 18 the direction of magnetization is away from the gap. The direction of magnetization of magnets 14 is opposite that of magnets 34.

It should be noted here that the term "magnet," as used in this description and the appended claims applies to a single magnet, such as described above for magnets in the sub-assemblies thereof, or a magnet assembled from a plurality of components providing a functionally equivalent polarity and direction of magnetization. Further, the functionality of the permanent magnets depicted in the drawings may also be embodied in a suitably designed electromagnets. Those skilled in the art will also recognize that the inventive Faraday rotator of FIGS. 1 and 2 can also be configured as an optical isolator by locating crystal 24 between polarizers in the manner of crystals 24A or 24B in FIG. 4.

In summary, the present invention is described above in terms of a preferred and other embodiments. The invention is not limited, however, by embodiments described and depicted herein. Rather the invention is limited only by the claims appended hereto.

What is claimed is:

1. A Faraday rotator, comprising:

first and second planar magnet-subassemblies spaced apart and parallel to each other forming a gap therebetween, with a propagation-axis of the rotator extending through the gap;

each of the magnet subassemblies including a first bar-magnet magnetized in a direction parallel to the propagation axis, the first bar-magnet being sandwiched between second and third bar-magnets magnetized in a direction perpendicular to the propagation axis and perpendicular to the gap, the first bar-magnets of the magnet subassemblies being magnetized in the same direction, the second bar-magnets being magnetized in opposite directions toward each other and the third bar-magnets being magnetized in opposite directions away from each other;

a magneto-optic crystal located in the gap on the propagation axis;

a temperature control element located outside of said gap; and a thermal conductor, extending from the temperature control element into the side edge of the gap, between the magnets and in a direction perpendicular to the propagation axis, said thermal conductor being in thermal communication along a side of crystal exposed by the gap.

2. The Faraday rotator of claim 1, wherein the temperature control element is a Peltier element.

3. The Faraday rotator of claim 1, wherein the temperature control element is a power resistor.

4. The Faraday rotator of claim 1, wherein the thermal conductor is a copper-tungsten thermal conductor.

5. The Faraday rotator of claim 1, wherein each of the magnets of the subassemblies has a length specified in a direction parallel to the propagation axis, a width specified in a direction perpendicular to the length and parallel to the gap, and a height specified in a direction perpendicular to the length and width, and wherein the length and height of the second and third bar-magnets in each of the magnet subassemblies is about the same, the length and height of the first bar-magnets in the magnet subassemblies is about the same, the height of the first second and third magnets in the magnet subassemblies is about the same and the length of the first bar-magnets is greater than the length of the second and third bar-magnets.

6. The Faraday rotator of claim 5, wherein the width of the first second and third bar-magnets in the magnet subassemblies is the same.

7. The Faraday rotator of claim 6, wherein the width of the first second and third bar-magnets is greater than the length of the first bar-magnets.

8. The Faraday rotator of claim 1, wherein the bar-magnets are permanent magnets made from an alloy including neodymium, iron, and boron.

9. The Faraday rotator of claim 1, wherein the magneto-optic crystal is a terbium gallium garnet crystal.

10. A Faraday rotator, comprising:

first and second planar magnet-subassemblies spaced apart and parallel to each other forming a gap therebetween with a propagation-axis of the rotator extending through the gap;

each of the magnet subassemblies including a first bar-magnet magnetized in a direction parallel to the propagation axis, the first bar-magnet being sandwiched between second and third bar-magnets magnetized in a direction perpendicular to the propagation axis, the first bar-magnets of each subassembly assembly creating a dipole magnetic field in the gap, and the second and third bar magnets of each subassembly creating a quadrupole magnetic field reinforcing the dipole magnetic field in in the gap, with the reinforced magnetic field providing magnetic lines of force in the gap parallel to propagation axis between the first magnets of the subassemblies;

a magneto-optic crystal located in the gap in the parallel magnetic lines of force;

a temperature control element located outside of said gap; and a thermal conductor, extending from the temperature control element into the side edge of the gap, between the magnets and in a direction perpendicular to the propagation axis, said thermal conductor being in thermal communication along a side of crystal exposed by the gap.

11. The Faraday rotator of claim 10, wherein the temperature control element is a Peltier element.

12. The Faraday rotator of claim 10, wherein each of the magnets of the subassemblies has a length specified in a direction parallel to the propagation axis, a width specified in a direction perpendicular to the length and parallel to the gap, and a height specified in a direction perpendicular to the length and width, and wherein the length and height of the second and third bar-magnets in each of the magnet subassemblies is about the same, the length and height of the first bar-magnets in the magnet subassemblies is about the same, the height of the first second and third magnets in the magnet subassemblies is about the same and the length of the first bar-magnets is greater than the length of the second and third bar-magnets.

13. The Faraday rotator of claim 12, wherein the width of the first second and third bar-magnets in the magnet subassemblies is the same.

14. The Faraday rotator of claim 13, wherein the width of the first second and third bar-magnets is greater than the length of the first bar-magnets.

* * * * *